United States Patent [19]

Sugimoto et al.

[11] Patent Number: 5,485,764
[45] Date of Patent: Jan. 23, 1996

[54] PARKING BRAKE SYSTEM

[75] Inventors: Akinori Sugimoto; Atsushi Mori; Kunio Nanno, all of Wako, Japan

[73] Assignee: Honda Giken Kogyo Kabushiki Kaisha, Tokyo, Japan

[21] Appl. No.: 261,918

[22] Filed: Jun. 16, 1994

[30] Foreign Application Priority Data

Jun. 16, 1993 [JP] Japan .................... 5-145199

[51] Int. Cl.⁶ ............................................ B60T 7/12
[52] U.S. Cl. .................. 74/535; 74/625; 192/12 BA; 192/8 C; 188/2 D
[58] Field of Search .............................. 74/512, 535, 560, 74/625; 192/8 C, 83, 12 BA; 188/2 D, 105, 106 P

[56] References Cited

U.S. PATENT DOCUMENTS 3,875,820  4/1975  Morden ........................ 74/625
5,335,563  8/1994  Yamamoto et al. .................. 74/512

*Primary Examiner*—Rodney H. Bonck
*Assistant Examiner*—Chong H. Kim
*Attorney, Agent, or Firm*—Armstrong, Westerman, Hattori, McLeland & Naughton

[57] ABSTRACT

A ratchet wheel, connected to a motor through a worm gear and a worm wheel, is supported on a pedal shaft which pivotally supports a brake pedal. The ratchet wheel engages a ratchet member mounted on the brake pedal. When the brake pedal is depressed, the ratchet member rotates on the pedal shaft so that the brake pedal is turned with the ratchet wheel remaining stationary. When the motor is driven, the ratchet member is brought into engagement, so that the brake pedal is turned along with the ratchet wheel. When the ratchet member is operated by a release arm, the brake pedal is released from the ratchet wheel and returned to an original position.

10 Claims, 14 Drawing Sheets

FIG. 7 (When brake is operated manually)

FIG. 8 (When brake is maintained)

FIG. 9 (When brake is operated electrically)

FIG. 10 (When brake is released)

PARKING BRAKE SYSTEM

BACKGROUND OF THE INVENTION

1. Field of Invention

The present invention relates to a parking brake system which is operable by manually operating a brake operating member by a driver, and operable by automatically operating the brake operating member by a brake operating drive source.

2. Description of the Related Art

Conventional parking brake systems for a vehicle are manually operated by a driver by depressing a brake pedal or by manually operating a brake lever.

If the parking brake system is designed to be operated electrically, it is possible to automatically operate the parking brake system by detecting operational conditions, such as by a signal to eliminate or reduce labor for driver operation and simplify driving operation.

In an arrangement in which the brake pedal is connected to an electric motor to enable automatic operation, however, a problem is encountered that, when the brake pedal is to be manually operated, the motor is externally rotated by a depression force on the brake pedal, and for this purpose, a large depression force is required, resulting in a reduced operability.

SUMMARY OF THE INVENTION

It is an object of the present invention to provide a parking brake system in which a manual operation and an automatic operation are possible and the manual operation is not impeded by a load of the drive source for the automatic operation.

To achieve the above object, according to a first feature of the present invention, there is provided a parking brake system which is operable by manually operating a brake operating member by a driver, and operable by automatically operating the brake operating member by a drive source, wherein the drive source and the brake operating member are interconnected through a unidirectional connecting member which permits the transmission of power from the drive source to the brake operating member and prohibits the transmission of power from the brake operating member to the drive source.

According to a second feature of the invention, in addition to the first feature, the parking brake system further includes a driving member connected to the drive source through a worm gear and a wormwheel, and a connection releasing member, wherein the connection releasing member is unidirectional and is mounted between the driving member and the brake operating member to connect both the members when one of relative movements in two ways between the members is carried out, and the connection releasing member releases the connection provided by the unidirectional connecting member.

According to a third feature of the invention, in addition to the first feature, the unidirectional connecting member comprises a first lock spring mounted between a drive roller connected to the drive source and a driven roller connected to the brake operating member to permit the relative rotation between both the rollers in one direction, and the parking brake system further includes a second lock spring for limiting the rotation of the driven roller in one direction, and connection-releasing members for expanding the first lock spring to permit the rotation of the driven roller.

According to a fourth feature of the invention, in addition to the first feature, the unidirectional connecting member comprises a first lock spring mounted between a drive roller connected to the brake drive source and a driven roller connected to the brake operating member for permitting relative rotation between both rollers in one direction. The parking brake system further includes a second lock spring for limiting the rotation of the driven roller in one direction, and connection-releasing members for expanding the first lock spring and a second lock spring to permit the rotation of the driven roller.

BRIEF DESCRIPTION OF THE DRAWINGS

The present invention will now be described in connection with a preferred embodiment and the accompanying drawings, in which.

DETAILED DESCRIPTION OF THE PREFERRED EMBODIMENTS

Figure 1:
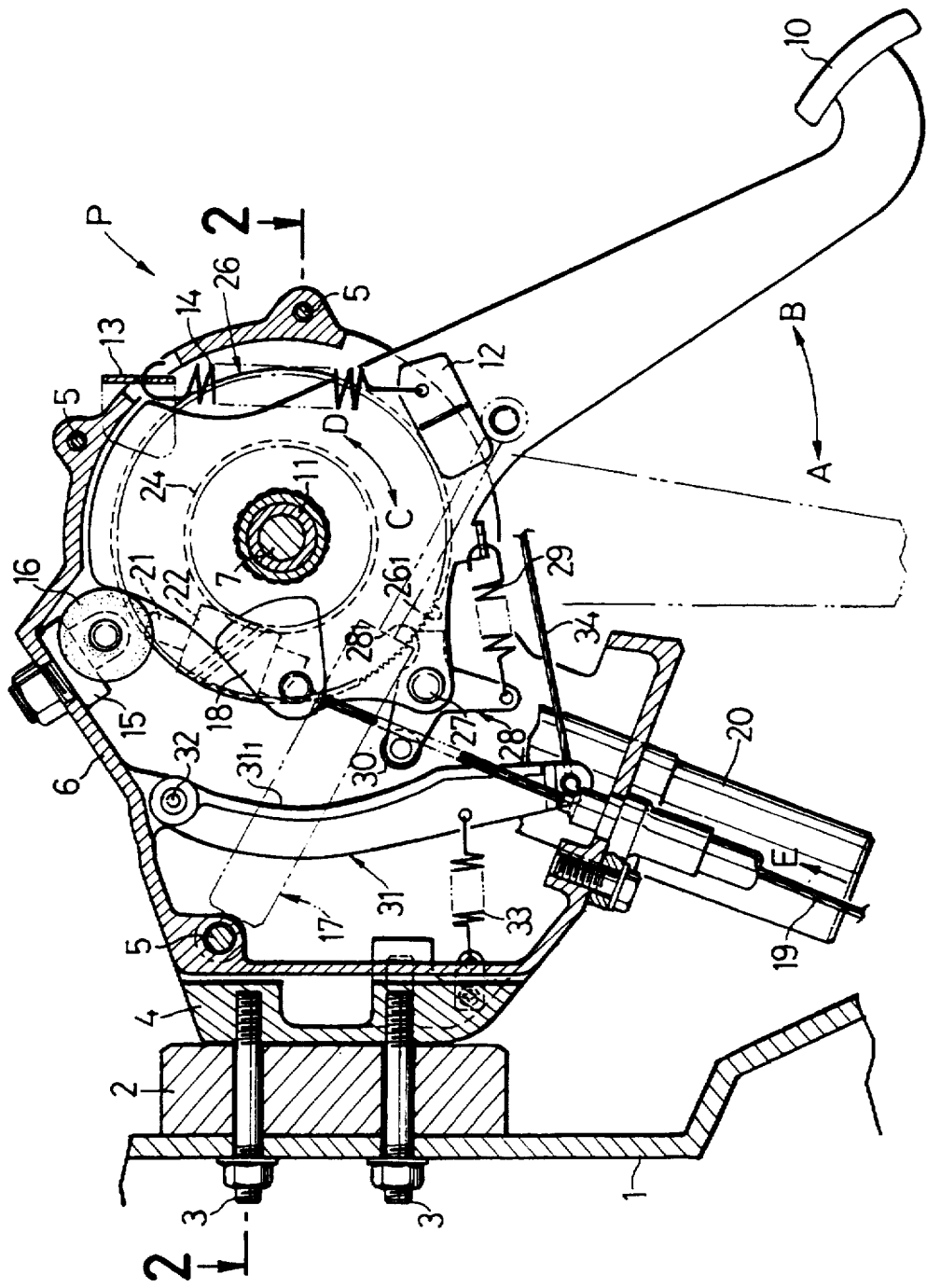
FIG. 1 is a side view of the entire parking brake system according to the first embodiment and taken along line 1—1 in FIG. 2.
Figure 2:
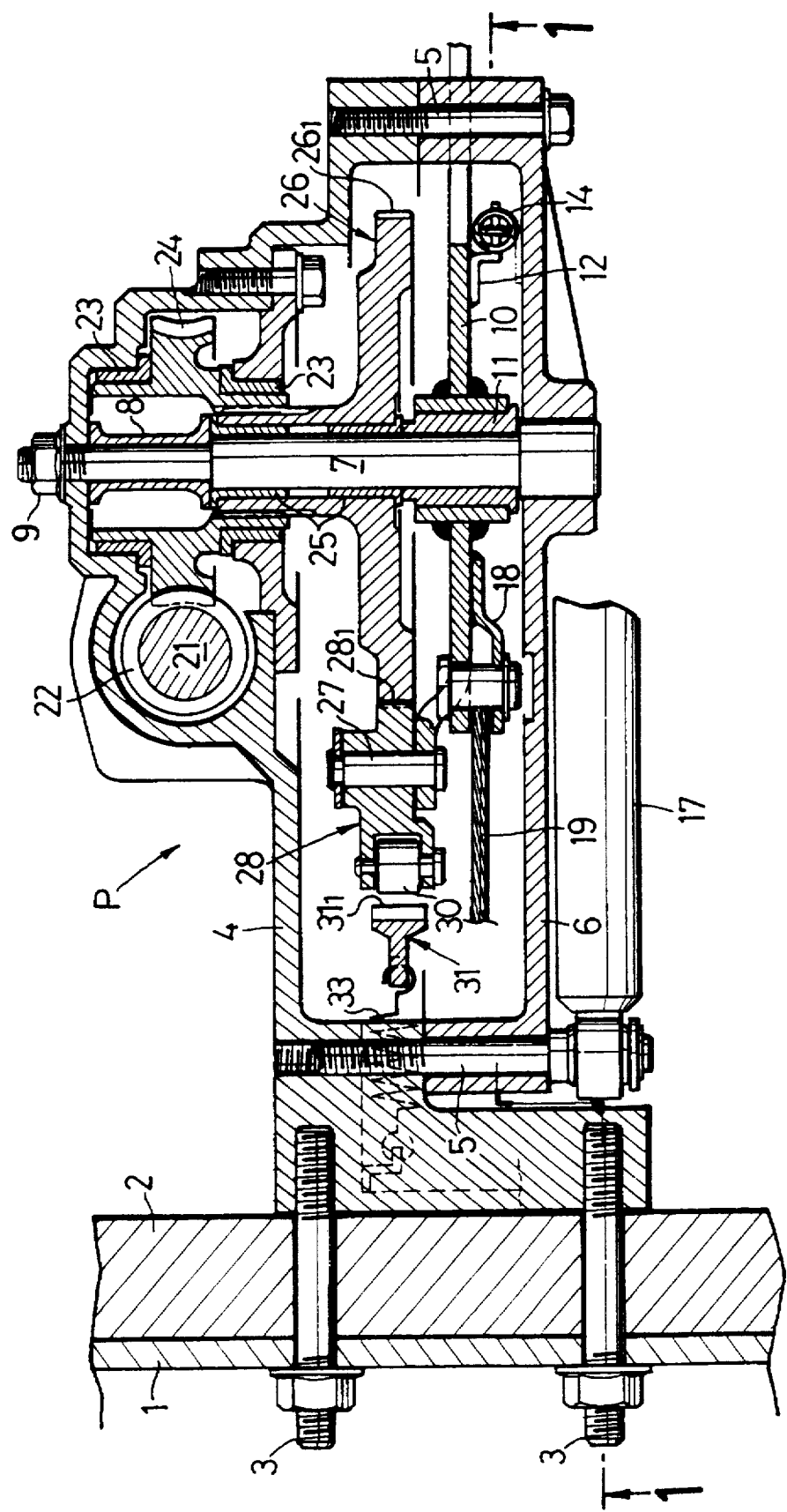
FIG. 2 is a sectional view taken along line 2—2 in FIG. 1.

As shown in FIGS. 1 and 2, a parking brake system P includes a casing 4 fixed to a vehicle body panel 1 by two bolts 3, 3, with a spacer 2 interposed therebetween, and a casing 6 coupled to a side of casing 4 by bolt 5. A pedal shaft 7 is mounted to extend between casings 4 and 6 and secured to casing 4 through collar 8 and nut 9. A brake pedal 10, operated by a driver's foot, is rotatably supported on pedal shaft 7 with metal bearing 11 interposed therebetween.

A pedal return spring 14 is stretched between bracket 12, mounted on the brake pedal 10, and bracket 13 mounted on casing 6. The brake pedal 10 is biased in a direction indicated by an arrow B by a resilient force of the spring 14 and stopped at a shown inoperative position in which the brake pedal 10 abuts against a stopper roller 16 supported on casing 6 through a bracket 15. In order to limit an abrupt return of the brake pedal 10 by the pedal return spring 14, the brake pedal 10 and the bolt 5 coupling the casings 4 and 6 are interconnected through a damper 17 which extends along an outer side of casing 6.

A brake cable 19 is fastened at one end thereof to a bracket 18 mounted on the brake pedal 10. If the brake pedal 10 is turned in a direction indicated by an arrow A, the brake cable 19 is pulled in a direction indicated by an arrow E to operate a rear brake assembly not shown.

A worm gear 22 is fixed to output shaft 21 of a motor 20 mounted on casing 4. The worm gear 22 is meshed with worm wheel 24 which is supported, through a pair of bearing metals 23, 23 within casing 4 in a coaxial relation to the pedal shaft 7, FIG. 2. A ratchet wheel 26 is supported on the pedal shaft 7 through a pair of bearing metals 25, 25 and is spline-coupled to the worm wheel 24.

Figure 3:
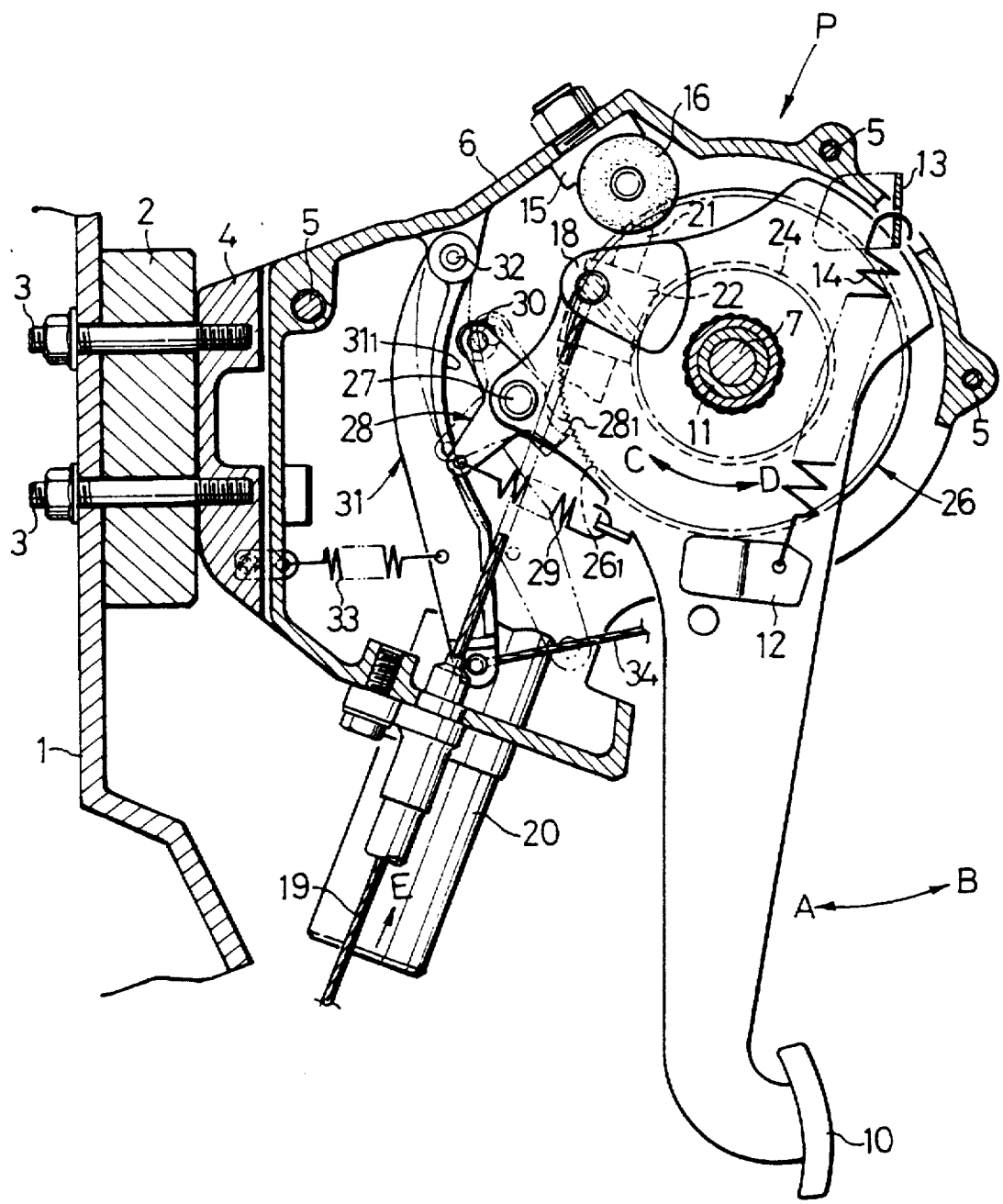
FIG. 3 is a view similar to FIG. 1 for explaining the operation.

A ratchet member 28 is pivotally supported on the brake pedal 10 through a pin 27, so that it is biased by a ratchet return spring 29, FIG. 3, stretched between the ratchet member 28 itself and the brake pedal 10. The ratchet member 28 has a ratchet claw $28_1$ engaging ratchet teeth $26_1$ formed around an outer periphery of the ratchet wheel 26. If the brake pedal 10 is turned in the direction of the arrow A, the ratchet claw $28_1$ slides relative to the ratchet teeth $26_1$ of the ratchet wheel 26. If the ratchet wheel 26 is turned in the direction of an arrow C, the ratchet claw $28_1$ is brought into engagement with the ratchet teeth $26_1$ so that the brake pedal 10 is pulled by the ratchet wheel 26 and turned in the direction of the arrow A.

In order to urge a roller 30, mounted in the ratchet member 28, FIG. 2, to move the ratchet claw $28_1$ away from the ratchet teeth $26_1$, a release arm 31, having a cam surface $31_1$, capable of abutting against the roller 30, is pivotally supported on casing 4 through a pin 32, FIG. 1. The release arm 31 is biased in a direction away from the roller 30 by a release arm return spring 33. The release arm 31 is connected through a release cable 34 to a release lever (not shown) mounted within a compartment and driven in a direction to abut against the roller 30. The distance between the pin 32 and a fastened point of the release cable 34 is set at a value larger than the distance between the pin 32 and the cam surface $31_1$ in order to reduce the load required for a releasing operation.

The operation of the first embodiment having the above-described construction will be described below.

To manually operate the parking brake system P, the driver depresses the brake pedal 10, as in a usual parking brake system. When the brake pedal 10 is depressed and turned in the direction of the arrow A, the ratchet claw $28_1$ of the ratchet member 28 mounted on the brake pedal 10 is caused to slide along the ratchet teeth $26_1$ of the ratchet wheel 26, which is in a stopped state. Therefore, when the brake pedal 10 is depressed to operate the parking brake system P, a depression force on the brake pedal 10 is prevented from being transmitted to the motor 20, and the depression force required for the brake pedal 10 cannot be increased by a load for externally rotating the motor 20.

When a driver releases his foot from the brake pedal 10, after depression of the brake pedal 10 from the inoperative position shown in FIG. 1 to an operative position shown in FIG. 3, the brake pedal 10 is intended to be returned in the direction of the arrow B by a resilient force of the pedal return spring 14. At this time the ratchet member 28 is swung from a position shown by a dashed line in FIG. 3 to a position shown by a solid line by a resilient force of the ratchet return spring 29, so that the ratchet claw $28_1$ thereof is brought into engagement with the ratchet teeth $26_2$ of the ratchet wheel 26, thereby causing the brake pedal 10 and the ratchet wheel 26 to be united. As a result, the ratchet wheel 26 is intended to be turned in a direction indicated by an arrow D along with the brake pedal 10, but because the worm wheel 24 integral with the ratchet wheel 26 has been meshed with the worm gear 22 of the motor 20, the turning movement of the ratchet wheel 26 in the direction of the arrow D, i.e., the turning movement of the brake pedal 10 in the direction of the arrow B is limited, and the brake pedal is locked at the operative position shown in FIG. 3.

When the driver has operated a switch (not shown), or a command signal is delivered from an electronic control unit in order to electronically operate the parking brake system, the motor 20 is driven. The rotation of the motor 20 is transmitted through the worm gear 22 and the worm wheel 24 to the ratchet wheel 26 to turn the ratchet wheel 26 in the direction of the arrow C. When the ratchet wheel 26 has been turned in the direction of the arrow C, the brake pedal 10 is also turned in the direction of the arrow A through the ratchet member 28 having the ratchet claw $28_1$ engaging the ratchet teeth $26_1$ of the ratchet wheel 26.

When the brake pedal has reached the operative position shown in FIG. 3, the driving of the motor 20 is stopped by a command from the electronic control unit, for example, by detecting an increase in load of the motor 20. At this time, the brake pedal 10 is locked at the operative position shown in FIG. 3 by meshing of the worm gear 22 with the worm wheel 24, as in the above-described manual operation.

When the release cable is pulled to manually release the operation of the parking brake system P, the release arm 31 is swung to the position shown by dashed line in FIG. 3 against the resilient force of the release return spring 33, so that the cam surface $31_1$ urges the roller 30 of the ratchet member 28. This causes the ratchet member 28 to be swung to the position shown by dashed line in FIG. 3 against the resilient force of the ratchet return spring 29, causing the engagement of the ratchet claw $28_1$ with the ratchet teeth $26_1$ to be released. As a result, the brake pedal 10 is turned in the direction of the arrow B by the resilient force of the pedal return spring 14 back to the inoperative position shown in FIG. 1.

When the motor 20 is driven in a direction opposite from the above-described direction to electrically release the operation of the parking brake system P, the rotation of the motor 20 is transmitted through the worm gear 22 and the wormwheel 24 to the ratchet wheel 26 to turn the ratchet wheel 26 in the direction of the arrow D. When the ratchet wheel 26 has been turned in the direction of arrow D, the brake pedal 10 is turned in the direction of the arrow B by the resilient force of the pedal return spring 14 back to the inoperative position shown in FIG. 1 along with the ratchet member 28 having the ratchet claw $28_1$ engaging the ratchet teeth $26_1$ of the ratchet wheel 26.

FIGS. 4 to 10 illustrate a second embodiment of the invention.

Figure 4:
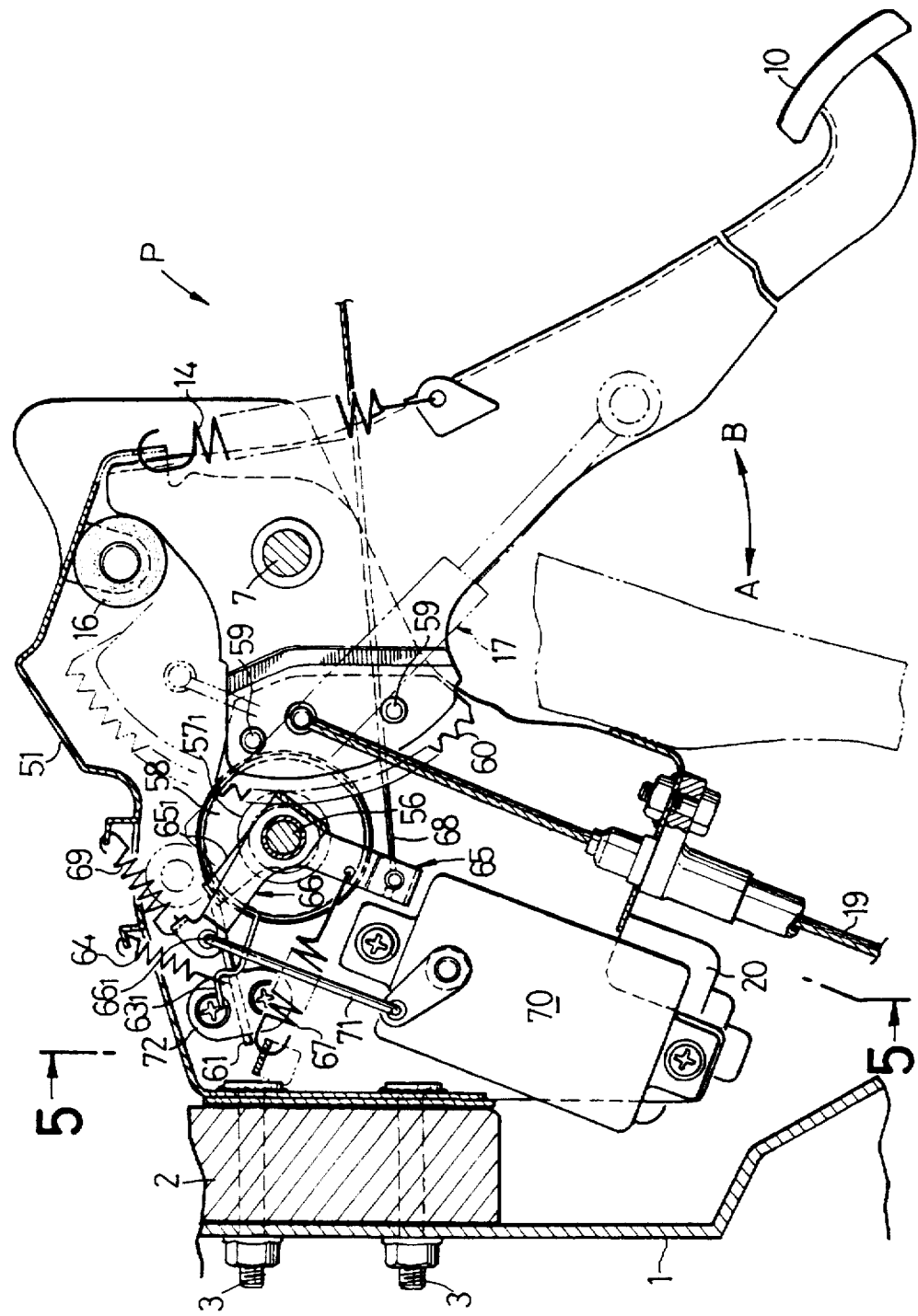
FIG. 4 is a side view of the entire parking brake system according to the second embodiment and taken along line 4—4 in FIG. 5.
Figure 5:
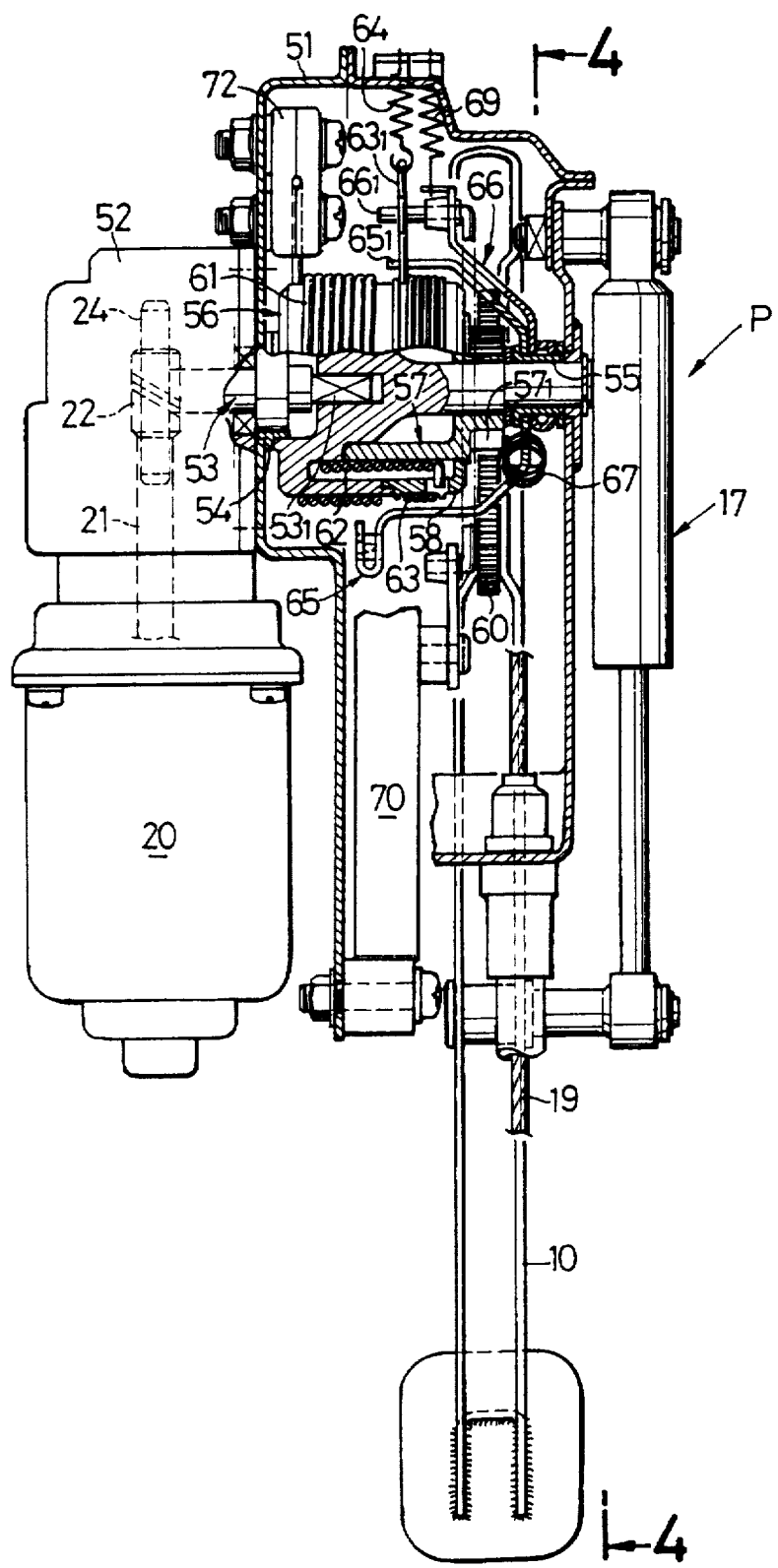
FIG. 5 is a sectional view taken along line 5—5 in FIG. 4.

As shown in FIGS. 4 and 5, a casing 51 is fixed to a vehicle body panel 1 by two bolts 3, 3 with a spacer 2 interposed therebetween. A brake pedal 10 is pivotally supported at its upper end on casing 51 through a pedal shaft 7 and connected to a rear brake assembly (not shown) through a brake cable 19. The brake pedal 10 is biased toward an inoperative position shown in FIG. 4 in which its upper end abuts against a stopper roller 16, by the action of a pedal return spring 14 stretched between the brake pedal 10 itself and the casing 51. The brake pedal 10 is connected to the casing 51 by a damper 17, so that it is prevented from being abruptly returned by the action of pedal return spring 15.

A motor 20 is supported on a sidewall of the casing 51 with a gear housing 52 interposed therebetween. A worm gear 22 is provided on an output shaft 21 of the motor 20 and meshed with a worm wheel 24 which is mounted on an input shaft 53 supported in the gear housing 52.

Figure 6:
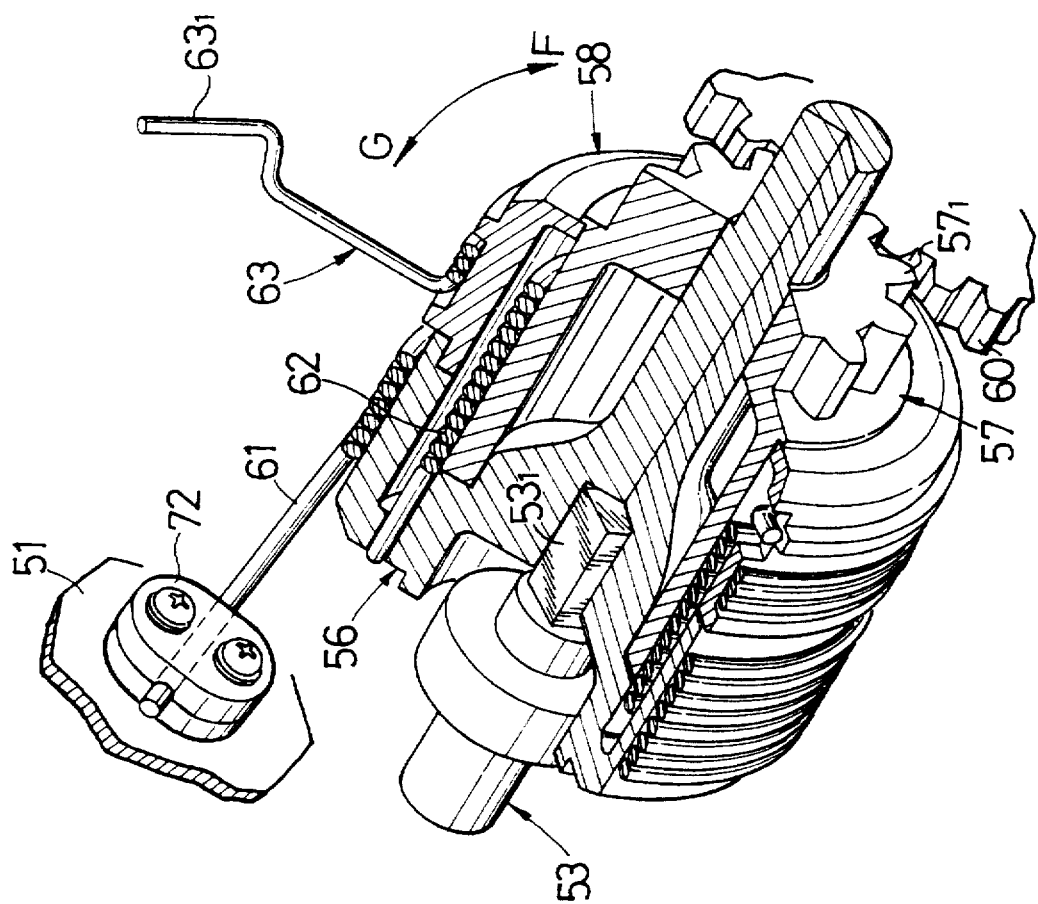
FIG. 6 is an enlarged perspective view of an essential portion.

As can be seen also from FIG. 6, a drive roller 56 is supported at its opposite ends on the casing 51 with bearing metals 54 and 55 interposed therebetween and is integrally coupled to an angle shaft portion $53_1$ of the input shaft 53. A driven roller 57 is coaxially and relatively rotatably carried on the drive roller 56, and a release roller 58 coaxially and relatively rotatably carried on the drive roller 56 and the driven roller 57. A pinion $57_1$ is integrally formed at a tip end of the driven roller 57 and meshed with a sector gear 60 which is secured to the brake pedal 10 by two bolts 59, 59.

A second lock spring 61 is wound around an outer periphery of the drive roller 56, with one end being a free end, and is fixed at the other end to the casing 51 through a fixing member 72. When the drive roller 56 is rotated in a direction of an arrow F in FIG. 6, the second lock spring 61 is contracted in diameter to lock the rotation of the drive roller 56, and when the drive roller 56 is rotated in a direction of an arrow G, the second lock spring 61 is expanded in diameter to permit the rotation of the drive roller 56.

A first lock spring 62 is wound around outer peripheries of the drive roller 56 and the driven roller 57 and secured at one end thereof to the drive roller 56 and locked at the other end to the release roller 58. When the drive roller 56 is rotated in the direction of the arrow G relative to the driven roller 57, or the driven roller 57 is rotated in the direction of the arrow F relative to the driven roller 56, the first lock spring 62 is contracted in diameter to integrally couple the drive roller 56 and the driven roller 57. When the drive roller 56 is rotated in the direction of the arrow F relative to the driven roller 57, or the driven roller 57 is rotated in the direction of the arrow G relative to the drive roller 56, the first lock spring 62 is expanded in diameter to permit the relative rotation between drive roller 56 and the driven roller 57.

A releasing lock spring 63 is wound around an outer periphery of the release roller 58. The releasing lock spring 63 has one end serving as a free end and the other end rising radially outwardly to serve as an operating end $63_1$. The operating end $63_1$ of the releasing lock spring 63 is biased in the direction of the arrow F by an expanding spring 64, FIGS. 4 and 5, which is stretched between the operating end $63_1$ and the casing 51, thereby permitting the releasing spring 63 to be expanded in diameter to retain the release roller 58 at an original position. When the operating end $63_1$ of the releasing lock spring 63 is moved in the direction of the arrow G, FIG. 6, against resilient force of the expanding spring 64, the releasing lock spring 63 is contracted in diameter to rotate the release roller 58 in the direction of the arrow G, so that the first lock spring 62 locked at the other end thereof to the release roller 58 can be forcibly expanded in diameter, thereby bringing the drive roller 56 and the driven roller 57 into their relatively rotatable states.

In order to remove the operating end $63_1$, of releasing lock spring 63, in the direction of the arrow G, against the resilient force of the expanding spring 64, a manually releasing arm 65 and an automatically releasing arm 66 are relatively rotatably carried on an outer periphery of a shaft portion of the drive roller 56. The manually releasing arm 65 is biased in a clockwise direction as viewed in FIG. 4 by a manually releasing lever return spring 67. When the manually releasing arm 65 is rotated in a counterclockwise direction by a release cable 68 connected to a releasing lever which is not shown, its engagement portion 651 is brought into abutment against the operating end $63_1$ of the releasing lock spring 63 to move the operating end $63_1$ in the direction of arrow G. The automatically releasing arm 66 is biased in the clockwise direction, as viewed in FIG. 4, by an automatically releasing lever return spring 69. When the automatically releasing arm 66 is rotated in the counterclockwise direction by an actuator 70, through a rod 71, its engagement portion $66_1$ is brought into abutment against the operating end $63_1$ of the releasing lock spring 63 to move the operating end $63_1$ in the direction of the arrow G.

The operation of the second embodiment having the above-described construction will be described below.

Figure 7:
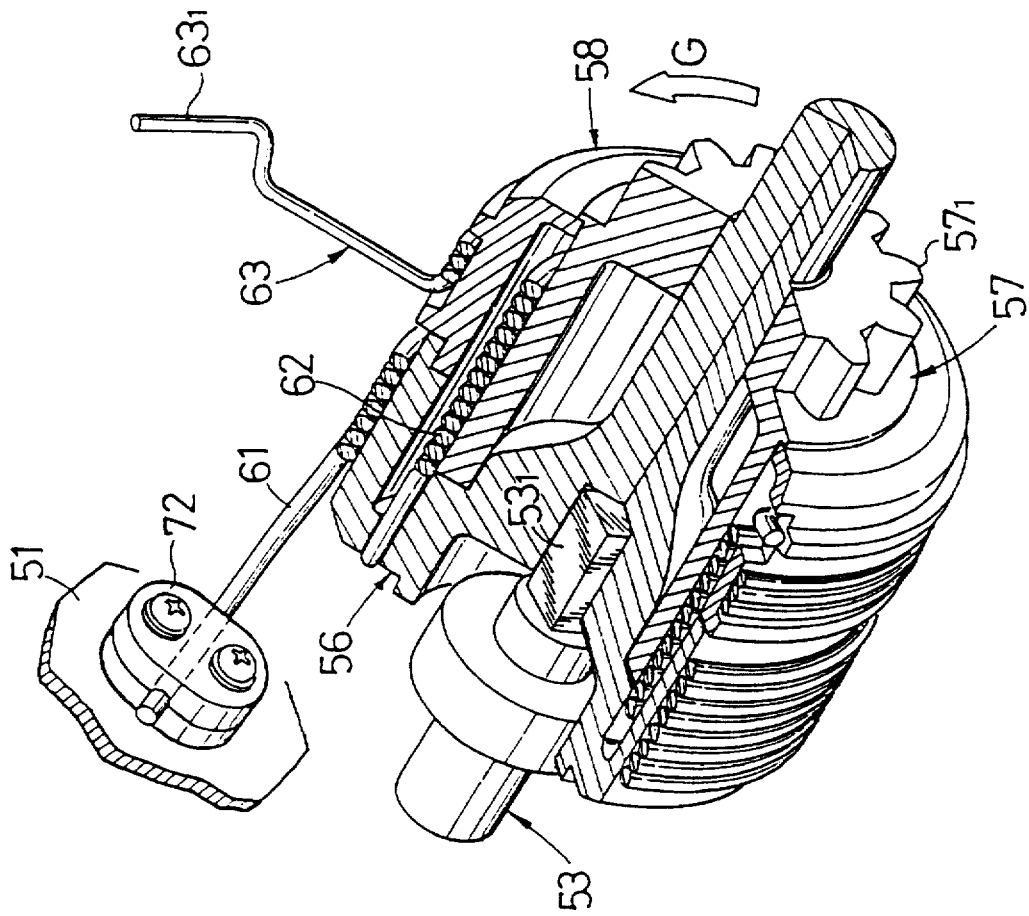
FIG. 7 is a view for explaining the operation, when the brake is operated manually.

When the brake pedal 10 is depressed and rotated in the direction of the arrow A to manually operate the parking brake system P, the driven roller 57 with the pinion $57_1$ meshed with the sector gear 50 is rotated in the direction of an arrow G in FIG. 7. As the driven roller 57 is rotated in the direction of the arrow G, the first lock spring 62 is expanded in diameter and hence, the drive roller 57 is separated from the driven roller 56 and rotated without hinderance. Thus, the depression force on the brake pedal 10 cannot be transmitted to the motor 20, thereby preventing unnecessary increase in depression force.

Figure 8:
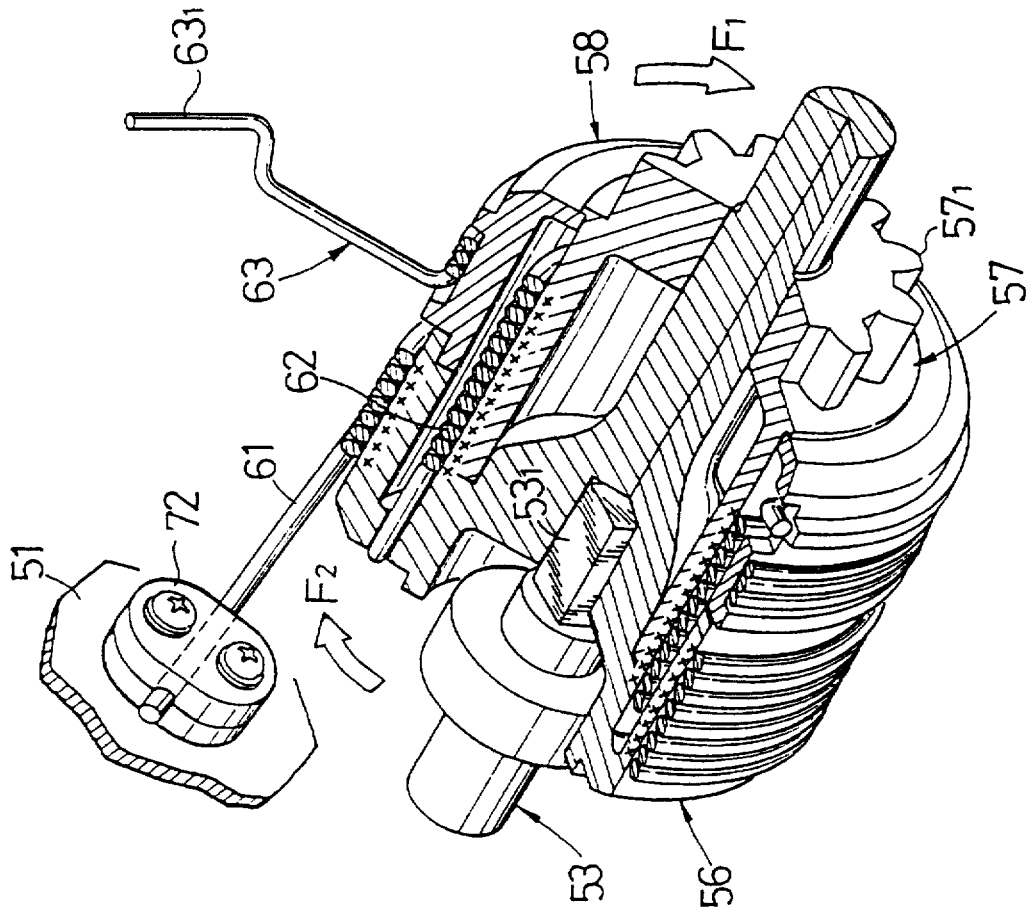
FIG. 8 is a view for explaining the operation, when the brake is maintained.

When a driver releases his foot from the brake pedal 10, after depression of the brake pedal 10 to the operative position shown by the dashed line in FIG. 4, the brake pedal 10 is intended to be returned in the direction of the arrow B by the resilient force of the pedal return spring 14, and the driven roller 57 is intended to be rotated reversely in a direction of an arrow $F_1$ in FIG. 8. However, when the driven roller 57 is intended to be rotated reversely in the direction of the arrow $F_1$, the first lock spring 62 is contracted in diameter, thereby uniting the driven roller 57 and the drive roller 56, and arresting the drive roller 56 intended to be rotated in a direction of an arrow $F_2$ by the second lock spring 61. Thus, the brake pedal 10 is locked at the operative position. Marks X in FIG. 8 indicate fastening portions of the spring.

Figure 9:
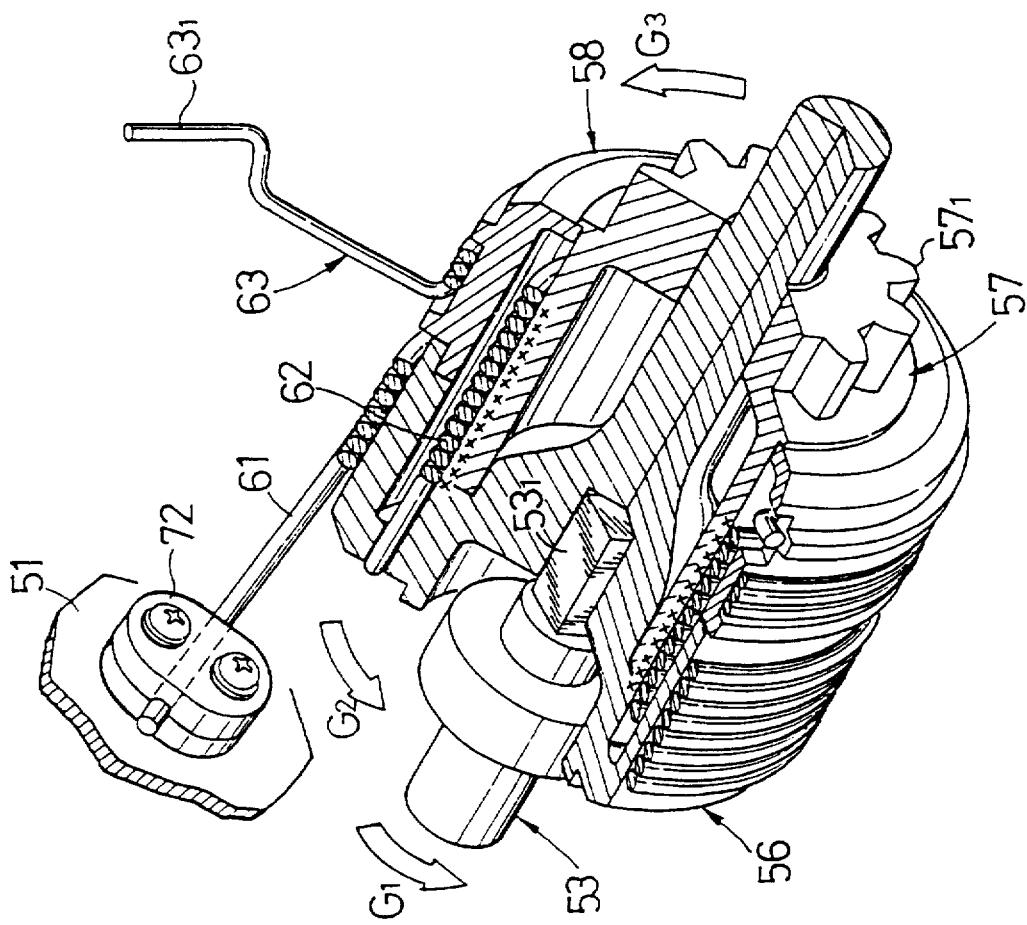
FIG. 9 is a view for explaining the operation, when the brake is operated electrically.
Figure 10:
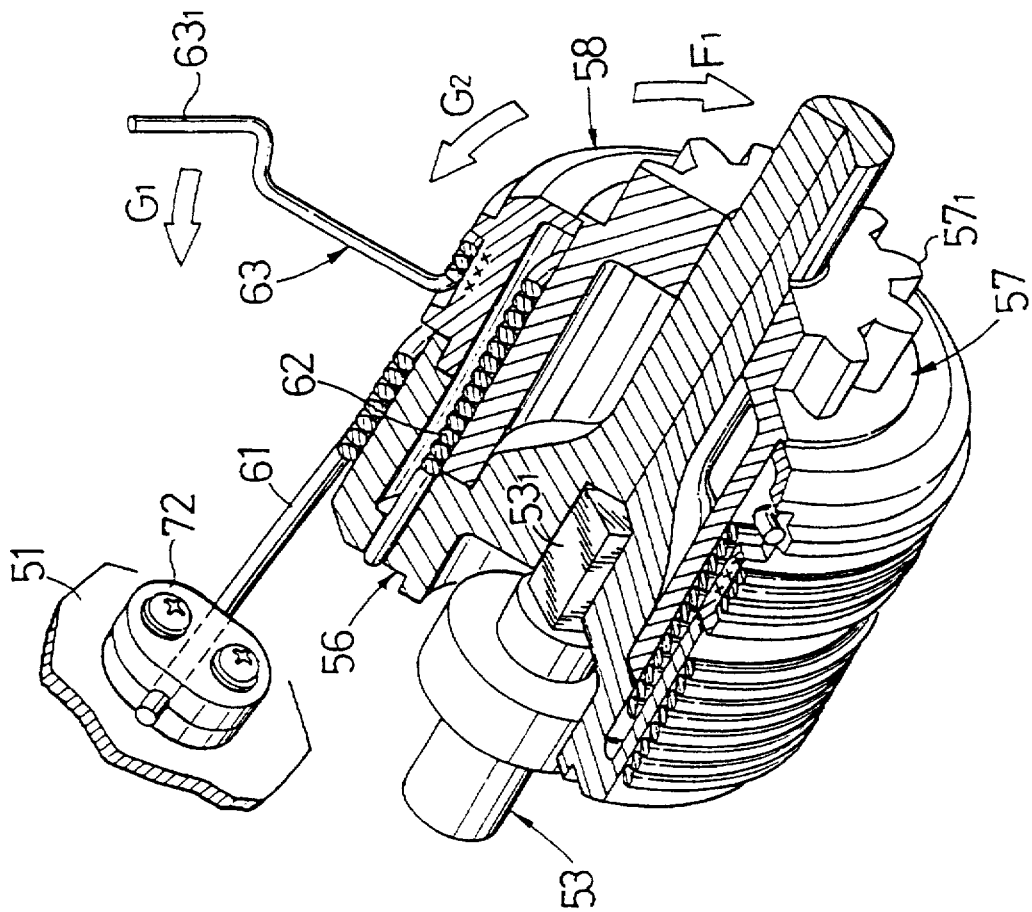
FIG. 10 is a view for explaining the operation, when the brake is released.

When the motor 20 is driven to rotate the input shaft 53 in a direction of an arrow $G_1$ in FIG. 9 in order to electrically operate the parking brake system P, the drive roller 56 integral with the input shaft 53 is also rotated in a direction of an arrow $G_2$. The rotation of the drive roller 56, in the direction of the arrow $G_2$, causes the first lock spring 62 to be contracted in diameter, thereby uniting the driven roller 57 with the drive roller 56 to rotate the driven roller 57 in a direction of an arrow $G_3$. It should be noted that the rotation of the drive roller 56, in the direction of the arrow $G_2$, causes the second lock spring 61 to be expanded in diameter, and hence, the rotation of the drive roller 56 is preformed with hinderance. Thus, the pedal 10 is turned in the direction of the arrow A in FIG. 4 to reach the operative position shown by the dashed line through the sector gear 60, meshed with the pinion $57_1$ of the driven roller 57.

When the brake pedal 10 has reached the operative position, the driving of the motor 20 is stopped, and the brake pedal 10 is locked at the operative position (see FIG.

8), as in the case where the brake pedal 10 has been operated manually.

To release the operation of the parking brake system P, the manually releasing arm 65, FIG. 4, may be turned in the counterclockwise direction as viewed in FIG. 4 by the release cable 68, or the automatically releasing arm 66 may be turned in the counterclockwise direction as viewed in FIG. 4 by the rod 71 connected to the actuator 70. This causes the engagement portion $65_1$ of the manually releasing arm 65, or the engagement portion $66_1$ of the automatically releasing arm 66 to urge the operating end $63_1$ of the releasing lock spring 63, in a direction of arrow $G_1$ in FIG. 10, to contract the releasing lock spring 63. As a result, the release roller 58, united with the releasing lock spring 63 is turned in a direction of arrow $G_2$ to expand the first lock spring 62, locked at one end to the release roller 58. When the first lock spring 62 has been expanded in diameter, the driven roller 57 is separated from the drive roller 56, and the brake pedal 10, biased by the resilient force of the pedal return spring 14, is returned to the inoperative position, independently of inertia of the motor 20, and the gears 22 and 24, while rotating the driven roller 57 in a direction of an arrow $F_1$ through the sector gear 60.

Figure 11:
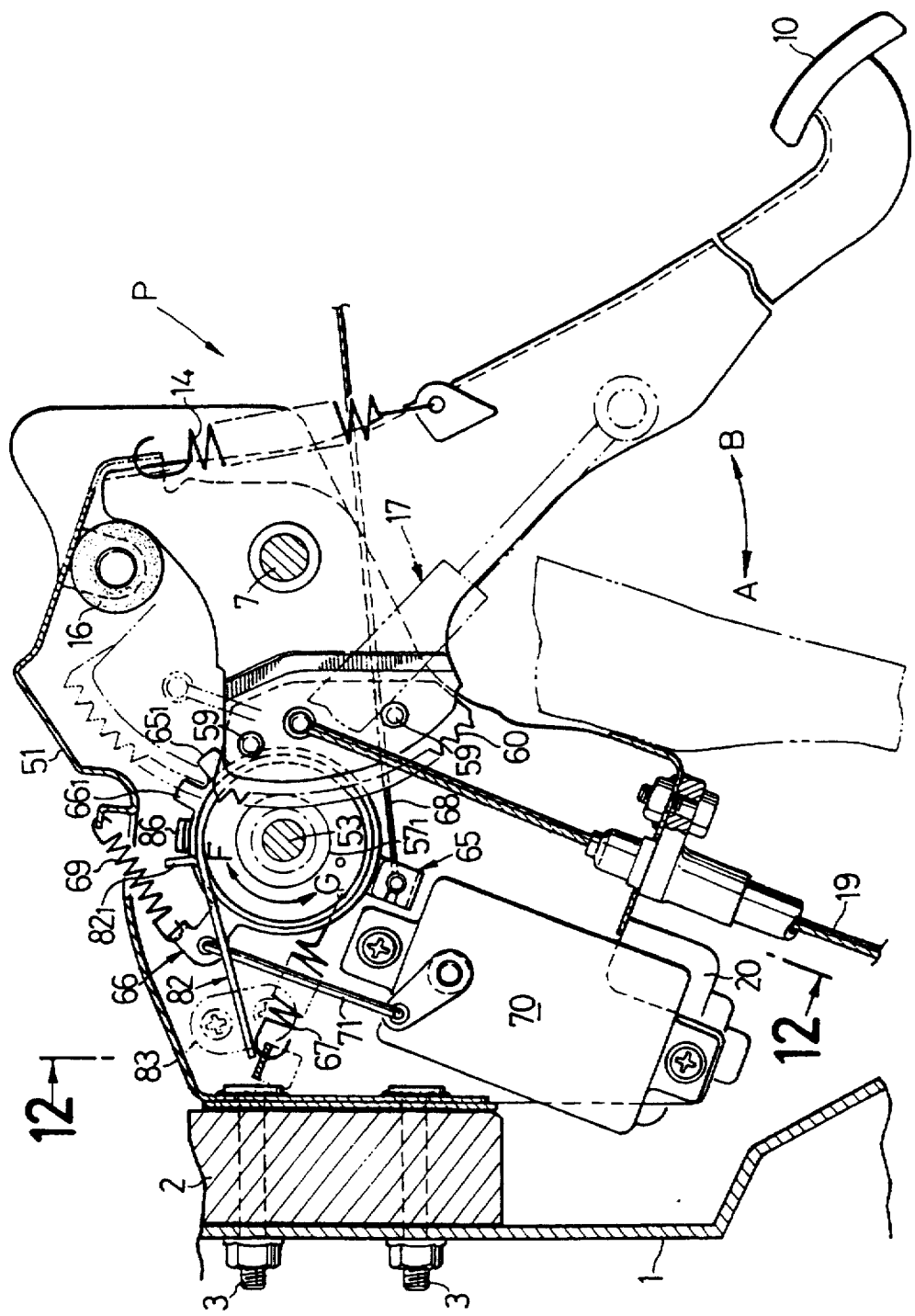
FIG. 11 is a side view of the entire parking brake system according to the third embodiment and taken along line 11—11 in FIG. 12.
Figure 12:
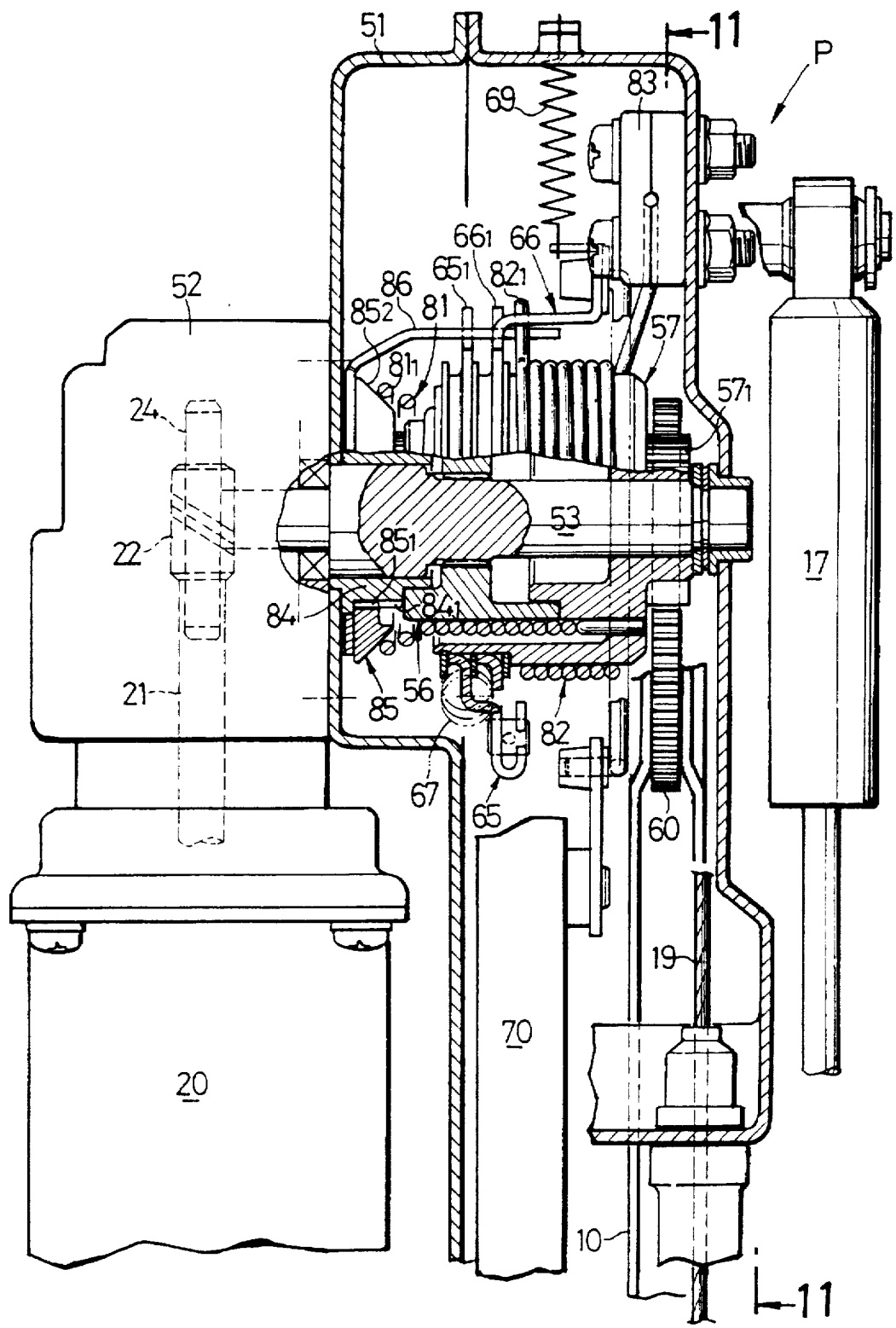
FIG. 12 is a sectional view taken along line 12—12 in FIG. 11.

FIGS. 11 and 12 illustrate a third embodiment corresponding to features defined in claims 1 and 4. The third embodiment has a structure similar to that of the second embodiment described above and hence, will be described mainly with regard to a difference between the embodiments.

As shown in FIGS. 11 and 12, a drive roller 56 is spline-coupled to an input shaft 53 rotatably supported to the casing 51 and driven by a motor 20, and a driven roller 57 is rotatably supported on the input shaft 53 for rotation relative to the drive roller 56. A first lock spring 81 is wound around the drive roller 56 and the driven roller 57. The first lock spring 81 is secured at one end thereof to the driven roller 57, with the other end thereof serving as a tapered operating end $81_1$. A second lock spring 82 is wound around an outer periphery of the driven roller 57. The second lock spring 82 is fixed at one end thereof to the casing by a fixing member 83, FIG. 11, with the other end thereof rising radially outwardly and serving as an operating end $82_1$.

A boss member 84 is secured to the casing 51 in such a manner that it is fitted over an outer periphery of the input shaft 53, and has a multiple thread portion $84_1$ around its outer periphery. A release member 85 has a multiple thread portion $85_1$ meshed with the multiple thread portion $84_1$ and is rotatably supported to the outer periphery of the boss member 84. A tapered surface $85_2$ is formed on one side of the release member 85 to engage the operating end 811 of the first lock spring 81 to spread the operating end $81_1$. Alternatively, in place of the multiple thread portions $84_1$ and $85_1$, cams may be employed.

A manually releasing arm 65 and an automatically releasing arm 66 are rotatably supported on an outer periphery of the driven roller 57. The manually releasing arm 65 is biased in a direction of an arrow F in FIG. 11 by a manually releasing lever return spring 67. When the manually releasing arm 65 is rotated in a direction of an arrow G by a release cable 68 connected to a release lever which is not shown, an engagement portion $65_1$ thereof urges a release arm 86 integral with the release member 85. The automatically releasing arm 66 is biased in the direction of the arrow F in FIG. 11 by an automatically releasing lever return spring 69. When the automatically releasing arm 66 is rotated in the direction of the arrow G through a rod 71 by an actuator 70, an engagement portion $66_1$ thereof urges the release arm 86.

When the release arm 86 is urged by the engagement portion $65_1$ of manually releasing arm 65 or by the engagement portion $66_1$ of the automatically releasing arm 66, it urges the operating end $82_1$ of the second lock spring 82 to expand the second lock spring 82.

The operation of the third embodiment having the above-described construction will be described below.

When the brake pedal 10 is depressed and turned in the direction of the arrow A to operate the parking brake system P, the driven roller $57_1$ with the pinion $57_1$ meshed with the sector gear 60 is rotated in the direction of the arrow G in FIG. 11. When the driven roller 57 is rotated in the direction of the arrow G, both of the first and second lock springs 81 and 82 are expanded and hence, the driven roller 57 is separated from the drive roller 56 and the casing 51 and can be rotated with a small load.

When a driver releases his foot from the brake pedal 10 after depression of the brake pedal 10 to an operative position, shown by a dashed line in FIG. 11, the brake pedal 10 is intended to be returned in a direction of arrow B by the resilient force of the pedal return spring 14, and the driven roller 57 is intended to be rotated reversely in the direction of the arrow F. However, when the driven roller 57 is intended to be rotated in the direction of the arrow F, the second lock spring 82 is contracted in diameter to couple the driven roller 57 to the casing 51, thereby locking the brake pedal 10 at the operative position.

When the motor 20 is driven to rotate the input shaft 53 and the drive roller 56 in the direction of the arrow G in order to electrically operate the parking brake system P, the first lock spring 81 is contracted in diameter, thereby causing the drive roller 56 to be united with the drive roller 57 to rotate the driven roller 57 in the direction of arrow G. This allows the brake pedal 10 to be turned in the direction of the arrow A in FIG. 11 through the sector gear 60 meshed with the pinion $57_1$ of the driven roller 57 to reach the operative position shown by the dashed line. At this time, the second lock spring 82 is expanded in diameter by the rotation of the driven roller 57 in the direction of the arrow G and hence, the rotation of the driven roller 57 is preformed without hinderance. When the brake pedal 10 has reached the operative position and the driving of the motor 20 has been stopped, the brake pedal 10 is locked at the operative position, as in the case where the brake pedal 10 has been operated manually.

When the manually releasing arm 65, or the automatically releasing arm 66, is turned in the direction of the arrow G, FIG. 11, to release the operation of the parking brake system P, the engagement portion $65_1$ of the manually releasing arm 65, or the engagement portion $66_1$ of the automatically releasing arm 66, urges the release arm 86 to rotate the release member 85. As a result, the release member 85, with its multiple thread portion $85_1$ meshed with the multiple thread portion $84_1$ of the boss member 84, is moved rightwardly as viewed in FIG. 12, so that the tapered surface 852 thereof urges the operating end $81_1$ of the first lock spring 81 to expand the first lock spring 81, thereby separating the driven roller 57 from the drive roller 56. This causes the driven roller 57 to be separated from inertia of the motor 20 and the gears 22 and 24.

When the release arm 86 has been further rotated, the second lock spring 82, with its operating end $82_1$ urged in the direction of the arrow G in FIG. 11, is expanded in diameter to separate the driven roller 57 from the casing 51. When the driven roller has been thus separated from the drive roller 56 and the casing 51, the brake pedal 10, biased by the pedal return spring 14, is returned to the inoperative position, while rotating the driven roller 57 in the direction of the arrow F through the sector 60.

Figure 13:
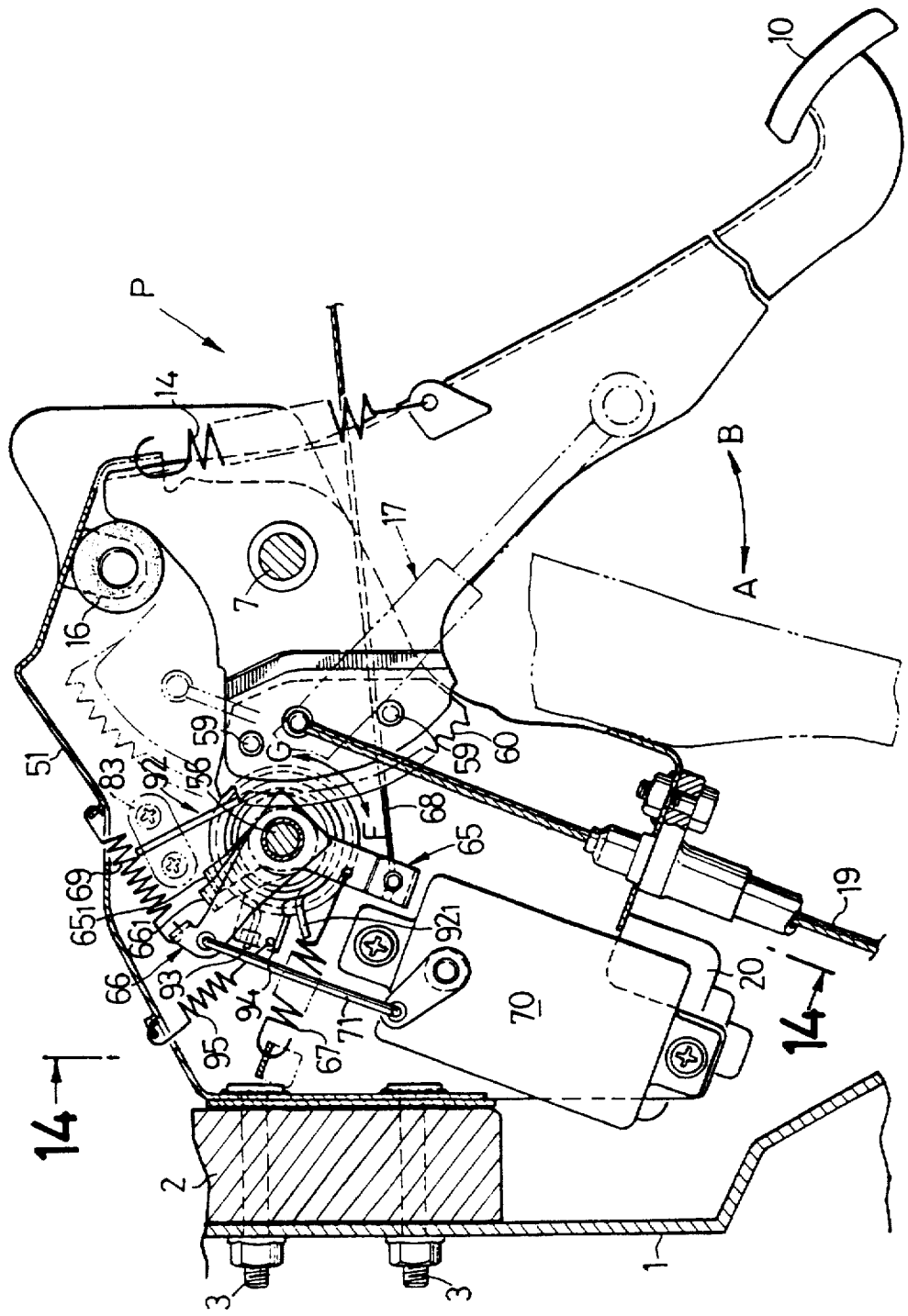
FIG. 13 is a side view of the entire parking brake system according to the fourth embodiment and taken along line 13—13 in FIG. 14.
Figure 14:
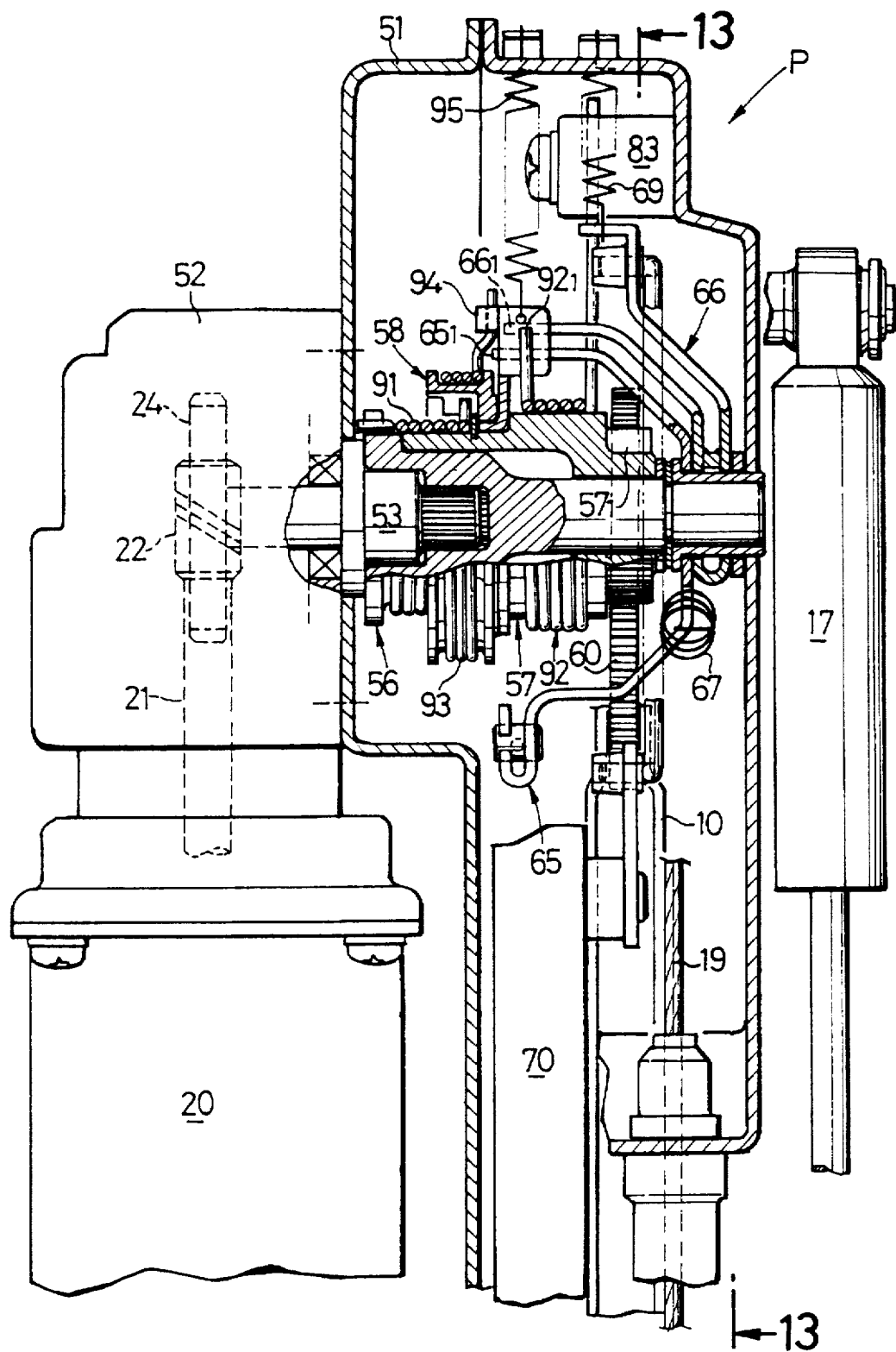
FIG. 14 is a sectional view taken along line 14—14 in FIG. 13.

FIGS. 13 and 14 illustrate a fourth embodiment.

The fourth embodiment has a structure similar to that of the third embodiment described above and hence, will be described mainly with regard to a difference between the embodiments.

A driven roller 57 is relatively rotatably supported on an outer periphery of a drive roller 56 which is spline-coupled to an input shaft 53 for rotation in unison with the latter. A release roller 58 is relatively rotatably supported on an outer periphery of the driven roller 57. A first lock spring 91 is wound around the drive roller 56 and the driven roller 57. The first lock spring 91 is secured at one end to the drive roller 56 and locked at its other end to the release roller 58. A second lock spring 92 is also wound around the outer periphery of the driven roller 57. The second lock spring 92 is fixed at one end to the casing 51 by a fixing member 83, with the other end thereof rising radially outwardly and serving as an operating end $92_1$. Further, a releasing lock spring 93 is wound around the release roller 58. The releasing lock spring 93 has one end serving as a free end, and a push plate 94 is mounted at the other radially outwardly rising end of the releasing lock spring 93. An expanding spring 95 for expanding the releasing lock spring 93 is stretched between the push plate 94 and the casing.

A manually releasing arm 65 is rotatably supported on the outer periphery of the drive roller 56 for rotation in a direction of an arrow G by a release cable 68, and has an engagement portion $65_1$ capable of urging the push plate 94 of the releasing lock spring 93. An automatically releasing arm 65 is also rotatably supported on the outer periphery of the drive roller 56 for rotation in the direction of the arrow G by an actuator 70, and has an engagement portion $66_1$ also capable of abutting against the operating end $92_1$ of the second lock spring 92 located forwardly in the direction of the arrow G to urge it.

The operation of the fourth embodiment having the above-described construction will be described below.

When the brake pedal 10 is depressed to rotate the driven roller 57 in the direction of the arrow G in FIG. 13 in order to operate the parking brake system P, both of the first and second lock springs 91 and 92 are expanded in diameter, and the driven roller 57 is thereby separated from the drive roller and the casing and thus, can be rotated freely in the direction of the arrow G.

When the driver releases his foot from the brake pedal 10, the driven roller 57 is intended to be rotated in a direction of an arrow F in FIG. 13 by the resilient force of the pedal return spring 14, but the second lock spring 92 is contracted in diameter to couple the driven roller 57 to the casing 51, thereby locking the brake pedal 10 at the operative position.

When the drive roller 56 is rotated in the direction of the arrow G, by the operation of the motor 20, in order to electrically operate the parking brake system P, the first lock spring 91 is contracted in diameter to unite the driven roller 57 to the drive roller 56 to rotate the driven roller 57 in the direction of the arrow G, thereby turning the brake pedal 10 to the operative position. At this time, the second lock spring 92 cannot be expanded in diameter to impede the rotation of the driven roller 57. When the brake pedal 10 has reached the operative position and the driving of the motor has been stopped, the second lock spring 92 is contracted in diameter to lock the brake pedal 10 at the operative position.

When the manually releasing arm 65, or the automatically releasing arm 66, is turned in the direction of the arrow G in FIG. 13, in order to release the operation of the parking brake system P, the engagement portion $65_1$ of the manually releasing arm 65, or the engagement portion $66_1$ of the automatically releasing arm 66, urges the push plate 94 to contract the releasing lock spring 93, thereby turning the release roller 58 in the direction of the arrow G along with the releasing lock spring 93. This causes the first lock spring, engaged at one end thereof with the releasing roller 58, to be expanded in diameter, thereby separating the drive roller 56 into a state independent from inertia of the motor 20 and the gears 22 and 24.

When the push plate 94 has been further rotated to urge the operating end $92_1$ of the second lock spring 92, the second lock spring 92 is expanded in diameter to separate the driven roller 57 from the casing 51. As a result, the driven roller 57 is separated from the drive roller 56 and the casing 51, and the brake pedal 10, biased by the pedal return spring 14, is returned to the inoperative position, while rotating the driven roller 57 in the direction of the arrow F.

Although the embodiments of the present invention have been described in detail, it will be understood that the present invention is not limited to these embodiments, and various modifications in design may be made without departing from the spirit and scope of the invention defined in the appended claims.

For example, the brake pedal 10 has been exemplified as the brake operating member in the embodiments, but the present invention is applicable to a vehicle including a brake lever which is operated manually. In addition, the drive source for the automatically operating the brake pedal is not limited to the electric motor 20, but a hydraulic motor or hydraulic cylinder may be used.

As discussed above, according to the first feature, when the brake operating member is to be operated by the drive source, the transmission of the power from the drive source to the brake operating member can be permitted through the unidirectional connecting member to automatically operate the brake operating member. When the brake operating member is to be operated manually, the transmission of the power from the brake operating member to the drive source can be prohibited to easily operate the brake operating member with a small depression force.

According to the second feature, the brake operating member can be locked at the brake-operative position by the fact that the driving member, connected to the drive source through the worm gear, and the worm wheel is connected with the brake operating member through the unidirectional connecting member. In addition, the brake operating member can be locked and returned to the brake-inoperative position by releasing the connection provided by the unidirectional connecting member by the connection-releasing member.

According to the third feature, the brake operating member can be locked at the brake-operative position by the fact that the drive roller connected to the drive source and the driven roller connected to the brake operating member are interconnected by the first lock spring serving as the unidirectional connecting member, and the rotation of the drive roller, in one direction is limited by the second lock spring. In addition, the locked brake operating member can be returned to the brake-inoperative position by releasing the locking of the driven roller caused by the first lock spring by the connection-releasing member.

According to the fourth feature, the brake operating member can be locked at the brake-operative position by the fact that the drive roller, connected to the drive source and the driven roller connected to the brake operating member, are interconnected by the first lock spring serving as the unidirectional connecting member. The rotation of the drive roller in one direction is limited by the second lock spring. In addition, the locked brake operating member can be unlocked and returned to the brake-inoperative position by releasing the locking of the driven roller caused by the first and second lock springs by the connection-releasing member.

What is claimed:

1. A parking brake system for a vehicle comprising:

a brake operating member providing manual operation of the parking brake system;

a drive source for automatically operating the parking brake system; and a unidirectional connecting member interconnecting said brake operating member and said drive source, wherein said unidirectional connecting member permits transmission of power from said drive source to said brake operating member and prevents transmission of power from said brake operating member to said drive source, wherein said unidirectional connecting member is comprised of a first lock spring which is mounted between a drive roller connected to the drive source and a driven roller connected to the brake operating member to permit the relative rotation between both the rollers in one direction and wherein said parking brake system further includes a second lock spring for limiting the rotation of the drive roller in one direction, and a connection-releasing member for expanding the first lock spring to permit the rotation of the driven roller.

2. A parking brake system for a vehicle comprising;

a brake operating member providing manual operation of the parking brake system;

a drive source for automatically operating the parking brake system; and a unidirectional connecting member interconnecting said brake operating member and said drive source, wherein said unidirectional connecting member permits transmission of power from said drive source to said brake operating member and prevents transmission of power from said brake operating member to said drive source, wherein said unidirectional connecting member is comprised of a first lock spring which is mounted between a drive roller connected to said drive source and a driven roller connected to said brake operating member to permit the relative rotation between both the rollers in one direction and wherein said parking brake system further includes a second lock spring for limiting the rotation of the driven roller in one direction, and a connection-releasing member for expanding the first lock spring and the second lock spring to permit the rotation of the driven roller.

3. A parking brake system according to claim 1 or 2, wherein said first and second lock springs, said drive roller and said driven roller are concentrically disposed with one another.

4. A parking brake system according to claim 1 or 2, wherein said connection-releasing member comprises a release roller and a releasing lock spring, said releasing lock spring being wound around said release roller, said first lock spring being secured at one end thereof to said release roller, and wherein when said releasing lock spring is operated in a direction to contract its diameter, said release roller is turned to expand a diameter of said first lock spring.

5. A parking brake system according to claim 2, wherein said connection-releasing member comprises a release arm and a release member, said release arm and said release member being threadedly engaged with each other through a multiple thread portion, and wherein when said release arm is turned, said release member is moved in its axial direction through said multiple thread portion so that a tapered surface formed on said release member urges said first lock spring so as to expand a diameter thereof.

6. A parking brake system according to claim 1, further comprising a casing, said second lock spring being secured at one end thereof to said casing.

7. A parking brake system according to claim 1 or claim 2, wherein said brake operating member is operated by a foot of a driver.

8. A parking brake system according to claim 1 or claim 2, wherein said drive source is a motor.

9. A parking brake system according to claim 1 or 2, wherein said connection-releasing member is operated manually and automatically.

10. A parking brake system according to claim 2, wherein said connection-releasing member comprises a release roller and a releasing lock spring, said releasing lock spring being wound around said release roller, said first lock spring being secured at one end thereof to said release roller, and wherein when said releasing lock spring is operated in a direction to contract its diameter, said release roller is turned to expand a diameter of said first lock spring, and a turning movement of said release arm causes said second lock spring to be expanded in diameter.

\* \* \* \* \*